United States Patent
Son et al.

(10) Patent No.: US 6,178,043 B1
(45) Date of Patent: Jan. 23, 2001

(54) MULTIVIEW THREE-DIMENSIONAL IMAGE DISPLAY SYSTEM

(75) Inventors: Jung Young Son, Sung-Nam Si (KR); Vadim V. Smirnov, Saint-Petersburg; Vadim V. Novoselsky, Saintpeterburg, both of (RU); Yong-Jin Choi, Seoul (KR); Hyuk-Soo Lee, Seoul (KR); Ji-Eun Ban, Seoul (KR)

(73) Assignee: Korea Institute of Science and Technology, Seoul (KR)

(*) Notice: Under 35 U.S.C. 154(b), the term of this patent shall be extended for 0 days.

(21) Appl. No.: 09/447,564

(22) Filed: Nov. 23, 1999

(30) Foreign Application Priority Data

Nov. 24, 1998 (KR) .................................. 98-50503

(51) Int. Cl.[7] .......................... G02B 27/22; G02B 27/24; G03B 21/00; H04N 13/04
(52) U.S. Cl. ......................... 359/462; 359/464; 359/471; 359/633; 353/7; 353/98; 353/99; 348/44; 348/45
(58) Field of Search ................................. 359/462, 464, 359/466, 630, 633, 634; 353/7, 98, 99; 348/55, 54; 396/324

(56) References Cited

U.S. PATENT DOCUMENTS

| 4,963,007 | 10/1990 | Moskovich . | |
|---|---|---|---|
| 5,357,277 | * 10/1994 | Nakayoshi et al. | 348/55 |
| 5,515,122 | * 5/1996 | Morishima et al. | 353/98 |
| 5,727,242 | * 3/1998 | Lo et al. | 396/324 |

OTHER PUBLICATIONS

Michael A. Gan, et al., "Demos: State–of–the–Art Application Software for Design, Evaluation, and Modeling of Optical Systems", Optical Engineering, vol. 31, No. 4, Apr. 1992, pp. 696–700.

Jung–Young Son, et al., "A Multiview 3–D Imaging System With Full Color Capabilities", SPIE Proc., Stereoscopic Displays and Virtual Reality IV in Electronic Imaging, 1998.

* cited by examiner

*Primary Examiner*—Audrey Chang
(74) *Attorney, Agent, or Firm*—Oblon, Spivak, McClelland, Maier & Neustadt, P.C.

(57) ABSTRACT

A multiview three-dimensional image display system comprises an image projection screen, two image generation components, a bifold mirror, an spatial light modulator, and projection optics. Each of the image generation components generates successive finite time sequences of time-multiplexed multiview images and thus form a channel of multiview images. Each of the reflecting surfaces of the bifold mirror reflects a different one of the two channels of multiview images. The spatial light modulator comprises a plurality of strip-like shutters, each of which transmits a different one of the finite time sequences of time-multiplexed multiview images. The projection optics projects the images through the spatial light modulator onto the image projection screen, where the spatial light modulator is imaged to make a single viewing zone.

12 Claims, 7 Drawing Sheets

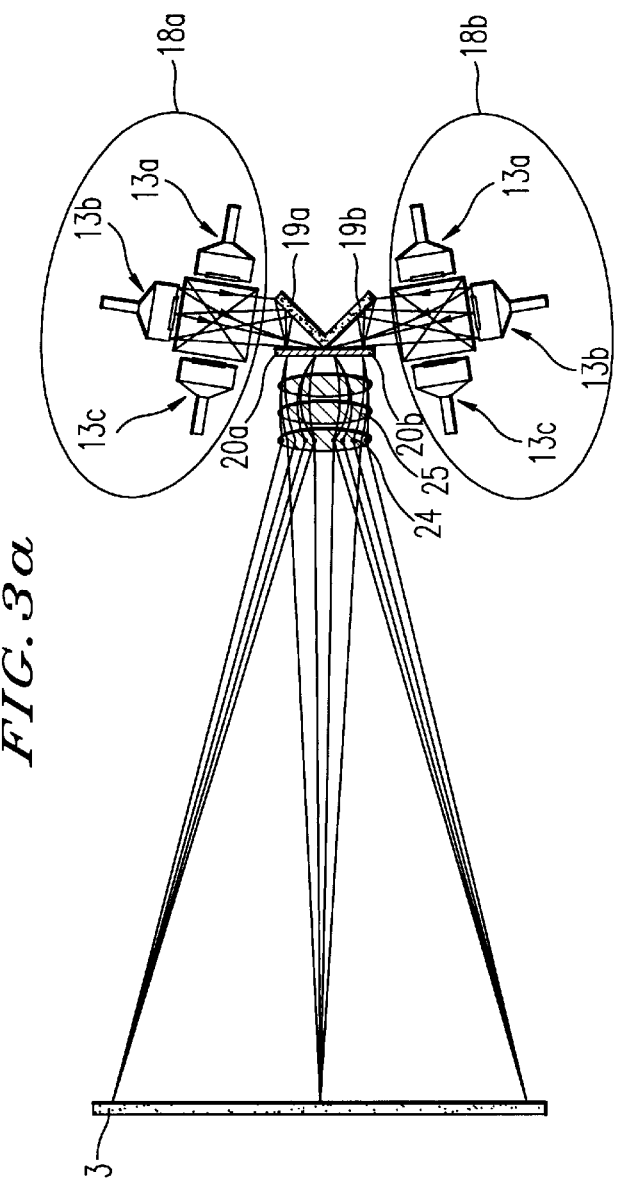
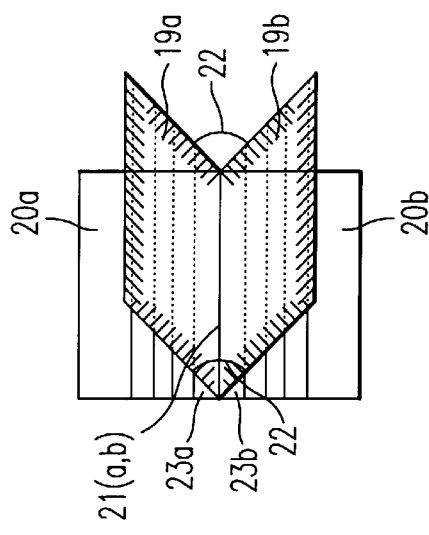
FIG. 3a
FIG. 3b

STRIP-LIKE SHUTTERS

STRIP-LIKE SHUTTERS

MULTIVIEW THREE-DIMENSIONAL IMAGE DISPLAY SYSTEM

BACKGROUND OF THE INVENTION

1. Field of the Invention

The present invention relates to three-dimensional image display systems and, more particularly, to an autostereoscopic multiview three-dimensional image display system.

2. Description of the Related Art

A multiview (or multiperspective) three-dimensional imaging system provides multiple pairs of two-dimensional images of a three-dimensional object. In order to simulate binocular parallax, one of any given pair of two-dimensional images is intended for the right eye of a viewer, while the other image of the given pair, different from the first, is intended for the left eye of the viewer. In order to simulate motion parallax, each of the pairs of images is captured from a different view (or perspective) of the object. A multiview three-dimensional imaging system thus provides only an illusion of a three-dimensional image, not a real three-dimensional image, since the multiview imaging system does not recreate the three-dimensional pattern of light rays emanating from the object, as does a. holographic imaging system.

In contrast to two-dimensional images, multiview three-dimensional images can be viewed only within a viewing zone of finite spatial extent. An important feature of a multiview three-dimensional image display system is accordingly the size and shape of the viewing zone formed. Another important feature is the method employed to display the multiview images. The multiple two-dimensional images of the object may, for example, be time-multiplexed, which involves sequentially displaying the multiple images at the frame rate of the display system.

FIGS. 1(a) and 1(b) provide plan and side views of a conventional multiperspective three-dimensional imaging system that utilizes time-multiplexing. Images 2 captured from various perspectives of a three-dimensional object are displayed on an image display device 1 and projected onto a screen 3 via projection optics 4 and a spatial light modulator 5.

The spatial light modulator, a multi-strip liquid crystal display(LCD) disposed at the exit pupil of the projection optics, comprises multiple parallel strip-like liquid crystal shutters, where the number of shutters is equal to the number of views or perspectives. The strip-like shutters, in effect, divide the exit pupil of the projection optics into multiple strips. The sequential openings and closings of the strip-like shutters are synchronized with the sequential display of the multiperspective images: a given strip-like shutter is open only when the image from the view or perspective corresponding to that shutter is to be displayed and is closed at all other times.

The screen, which may be a holographic screen, distributes the multiview images transmitted by the liquid crystal shutters over a plurality of viewing zones 6a, 6b, ..., 6n. Each of the viewing zones is, in effect, divided by the strip-like shutters. The multiview images may be generated by a multiview camera 7 or a computer 8 and time-multiplexed by a signal converter 9. The spatial light modulator is itself driven by a shutter driver 10 that is synchronized with the sequence of multiview images by the signal converter.

The multiview three-dimensional imaging system illustrated in FIG. 2 is capable of displaying full-color images (Jung-Young Son, Victor G. Komar, You-Seek Chun, Sergei Sabo, Victor Mayorov, L. Balasny, S. Belyaev, Mihail Semin, M. Krutik, and Hyung-Wook Jeon, "A multiview 3-D imaging system With full color capabilities," SPIE Proc. Stereoscopic Displays and Virtual Reality IV in Electronic Inmaging'98, San Jose, USA. Jan., 1998, pp. 24–30 3295A-31). An image generation component 18 comprises three image display devices 13a–13c and a dichroic beam splitter 15. The image display devices 13a–13c, each of which is disposed at a different surface of the beam splitter, display three primary color images 14a–14c, respectively. The beam splitter combines the three primary color images into a full-color image. The full-color image is projected onto the image projection screen 3 after transiting a fourth surface of the beam splitter, projection optics 16, and a spatial light modulator 17, in that order.

To display N time-multiplexed multiview images without flicker, where each of the multiview images is provided by a different one of N identical individual display devices, a multiview image display system must have the same spatial resolution as each of the multiview images and a frame rate N times that of each of the individual display devices. Thus, to display eight multiview images without flicker, each provided by a conventional entertainment television, the frame rate of the multiview image display system must be greater than 240 frames/s, since the frame rate of the conventional NTSC TV is 30 frames/s.

Display devices suitable for the time multiplexing method, include the cathode ray tube(CRT), the digital micromirror device, and the ferroelectric LCD. Of these, the CRT has the best resolution and is easiest to use. Although CRTs can display as many as 28 multiview images, such a CRT is not commercially available. The marginal frame rate of the commercially available CRT for a flickerless image is 240 frames/s, which can display, 8 view images with the resolution of NTSC TV. To display a greater number of images, the development of a new display device with a faster response speed is needed, which requires more time and cost than those required in the development of a higher resolution flat display device for the space multiplexing method.

BRIEF DESCRIPTION OF THE DRAWINGS

FIG. 3 schematically illustrates a two-channel multiview three-dimensional imaging system according to an embodiment of the present invention.

SUMMARY OF THE INVENTION

The multiview three-dimensional image display system disclosed in the present application comprises an image projection screen, two image generation components, a bifold mirror, a spatial light modulator, and projection optics. Each of the two image generation components generates successive finite time sequences of time-multiplexed multiview images and, consequently, forms a channel of multiview images. The bifold mirror has two reflecting surfaces, each reflecting a different one of the two channels of multiview images. The spatial light modulator comprises a plurality of parallel strip-like liquid-crystal shutters, each of which transmits a different one of each of the finite time sequences of time-multiplexed multiview images. The projection optics projects the images through the spatial light modulator onto the image projection screen, where the spatial light modulator is imaged to make a single viewing zone.

The folding line of the bifold mirror is disposed parallel to the line of symmetry of the spatial light modulator. The mirror has such a folding angle such that each half of the spatial light modulator transmits images reflected by only one of the reflecting surfaces of the mirror. The number of strip-like shutters is twice the larger of the two numbers of time-multiplexed multiview images in each finite time sequence of images generated by the two image generation components. The openings/closings of corresponding strip-like shutters on either side of the line of symmetry of the spatial light modulator are synchronized.

DETAILED DESCRIPTION OF PREFERRED EMBODIMENTS OF THE INVENTION

Figure 1A:
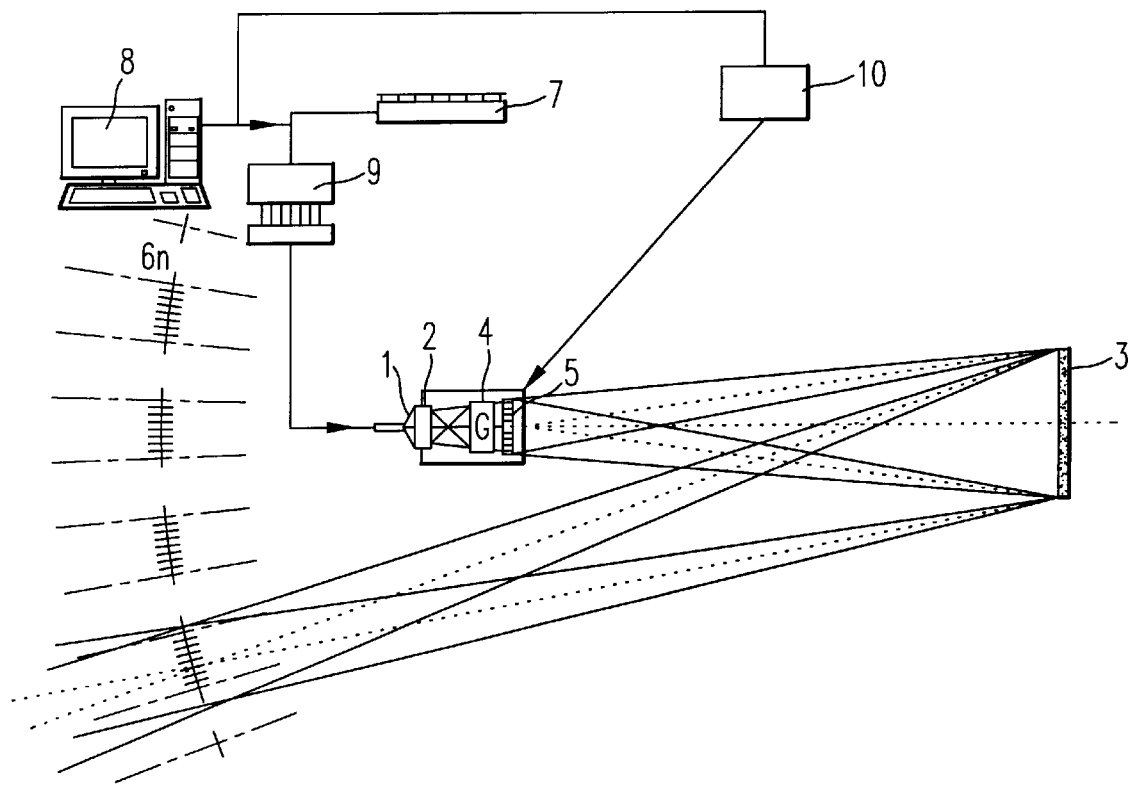
FIGS. 1(a) and 1(b) illustrate plan and side views, respectively, of a conventional monochrome multiview three-dimensional imaging system.
Figure 1B:
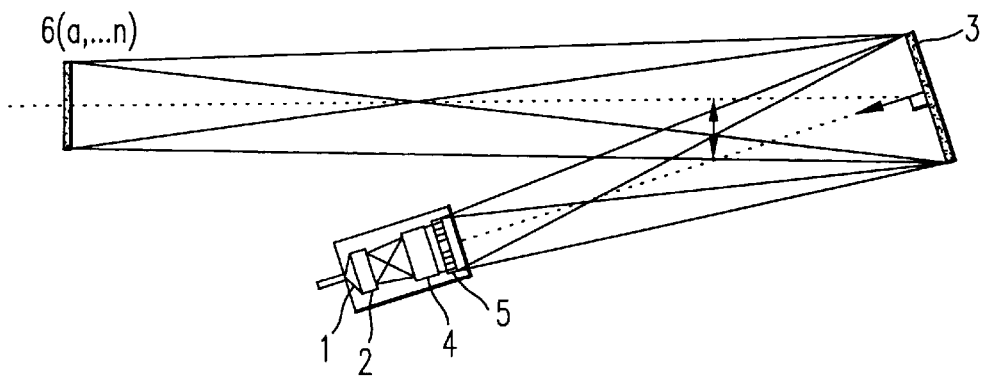
Figure 2:
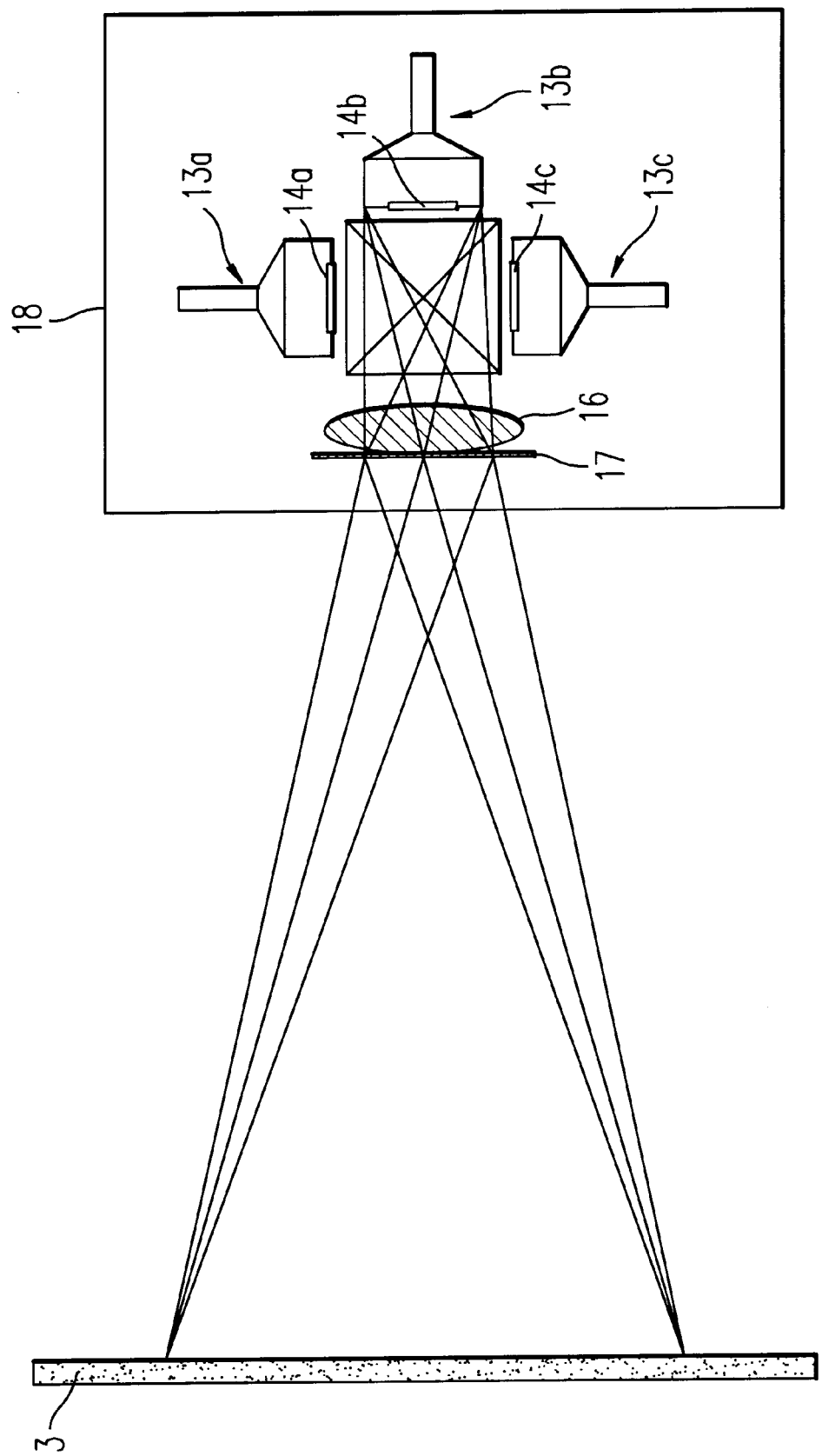
FIG. 2 illustrates a side view of a conventional full-color multiview three-dimensional image display system.

FIG. 3 illustrates a multiview three-dimensional image display system according to an embodiment of the present invention. The display system includes a right image generation component 18a and a left image generation component 18b, each as shown in FIG. 2, which are disposed at either side of a bifold mirror 19 having a right reflecting surface 19a and a left reflecting surface 19b, a folding line 21a, and a folding angle 22. Images from the right image generation component 18a are reflected at the right reflecting surface 19a, and images from the left image generation component 18b are reflected at the left reflecting surface 19b. The reflected images are then projected onto a screen 3 via a spatial light modulator 20 and projection optics 25.

The spatial light modulator, which is disposed at the entrance pupil of the projection optics, comprises a plurality of parallel strip-like liquid-crystal shutters 23, where the number of strip-like shutters is twice the larger of the two numbers of time-multiplexed multiview images in each of the finite time sequences generated by the left and right image generation components. The spatial light modulator has a line of symmetry that is parallel to the strip-like liquid crystal shutters and, in effect, divides the spatial light modulator into left and right halves.

The folding line 21a of the bifold mirror is parallel to the line of symmetry 21b of the spatial light modulator. The folding angle of the bifold mirror is such that the left half 20b of the spatial light modulator 20 transmits images only from the left image generation component 18b, while the right half 20a of the spatial light modulator 20a transmits images only from the right image generation component 18a.

At its exit pupil, the projection optics forms an image of the spatial light modulator. An image of the spatial light modulator formed at the exit pupil 24 is preferably as large as the spatial light modulator in order to minimize optical aberrations. Any aberration would result in an overlapped or distorted image of the spatial light modulator in the viewing zone. The left and the right halves of the spatial light modulator spatially combine images from the left and right image generation components into a single viewing zone.

Figure 4A:
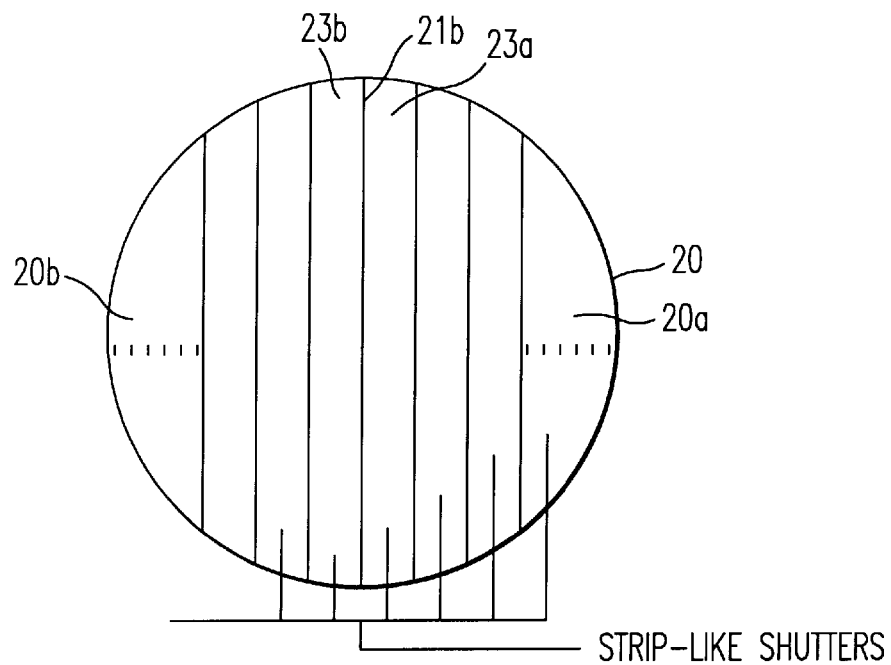
FIGS. 4(a) and 4(b) illustrate shapes of the spatial light modulators according to embodiments of the present invention.
Figure 4B:
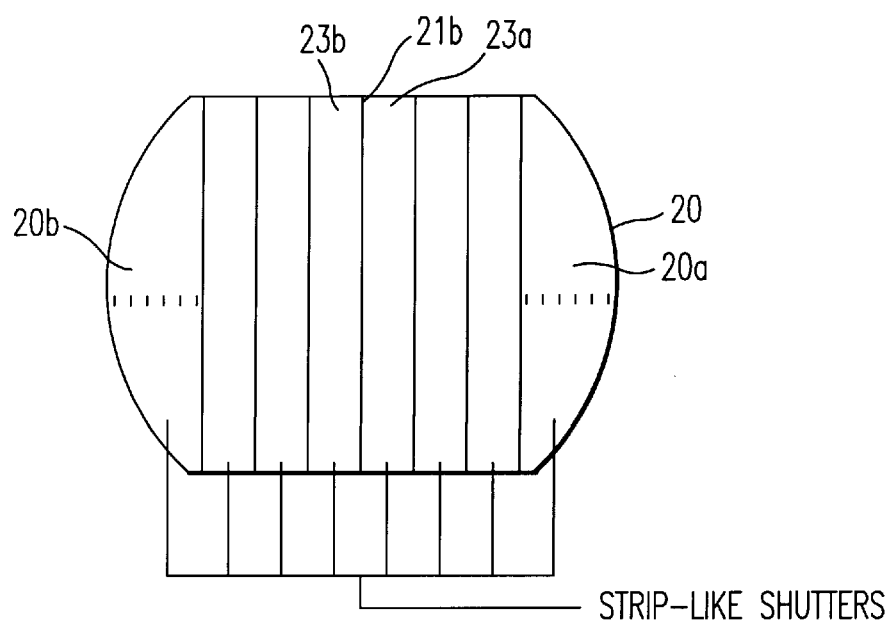

FIGS. 4(a) and 4(b) illustrate shapes of the spatial light modulator according to embodiments of the present invention. The spatial light modulator may be circular with diameter equal to that of the exit pupil of the projection optics, as shown in FIG. 4(a), or may have a race track shape with horizontal length equal to the diameter of the exit pupil, as shown in FIG. 4(b). Other shapes and sizes of the spatial light modulator are. also possible, although the largest dimension of the spatial light modulator should not exceed the dimension of the exit pupil of the projection optics.

Figure 5:
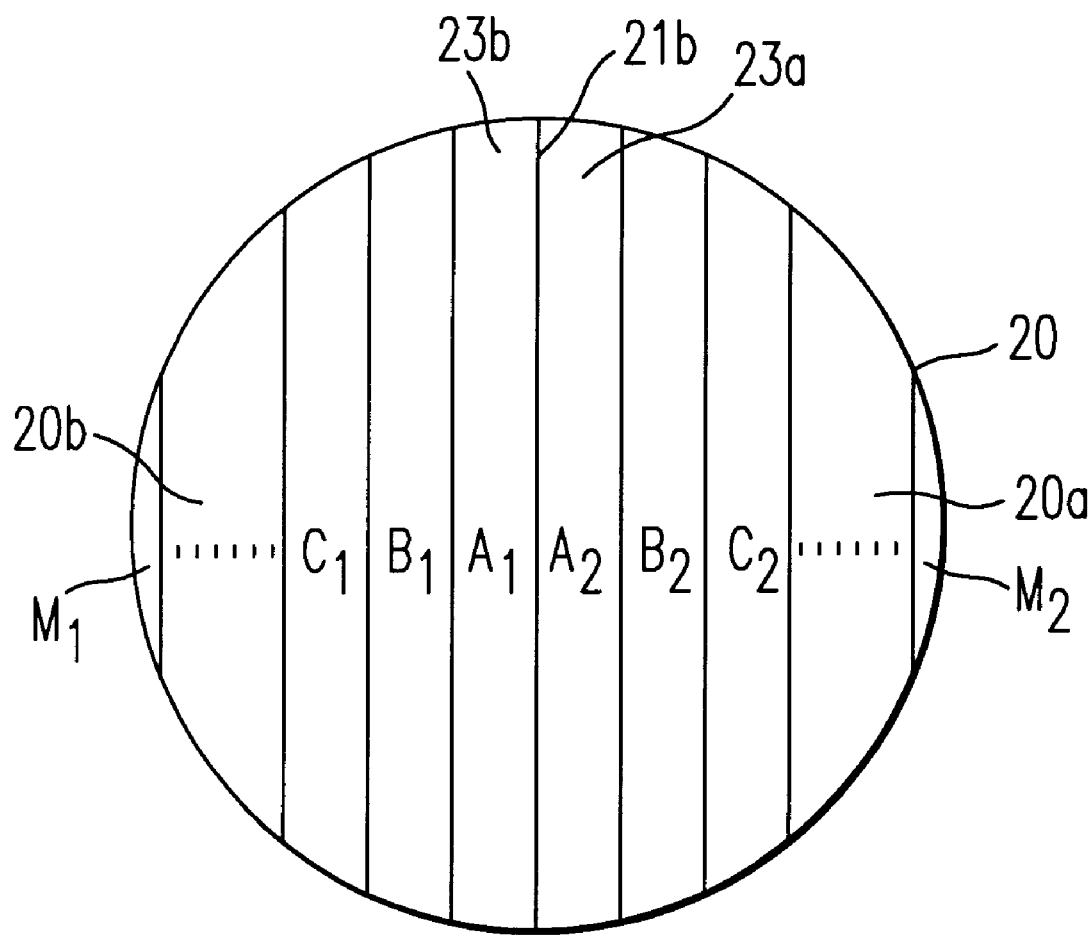
FIG. 5 illustrates the sequential openings and closings of strip-like shutters of a spatial light modulator according to an embodiment of the present invention.

FIG. 5 illustrates the symmetrical openings/closings of strip-like liquid-crystal shutters of the spatial light modulator according to embodiments of the present invention. Pairs of strip-like shutters are symmetrically disposed with respect to the line of symmetry of the spatial light modulator 20: $A_1$ and $A_2$; $B_1$, and $B_2$; ...; $M_1$, and $M_2$. The openings/closings of each such pair of shutters are synchronized: both shutters of each pair must be opened/closed at the same times, and no two pairs of shutters may be open simultaneously. The order of opening may be from the interior pair to the exterior pair and back (i.e., $A_1$, and $A_2$ open, then $B_1$ and $B_2$ open, ..., then $L_1$ and $L_2$ open, then $M_1$ and $M_2$ open, then $L_1$ and $L_2$ open, ..., then $A_1$ and $A_2$ open) or from the exterior pair to the interior pair. Three-dimensional images would not be apparent unless the strip-like shutters were opened and closed in pairs; the three dimensional images would overlap unless contiguous shutters were sequentially opened and closed.

Figure 6:
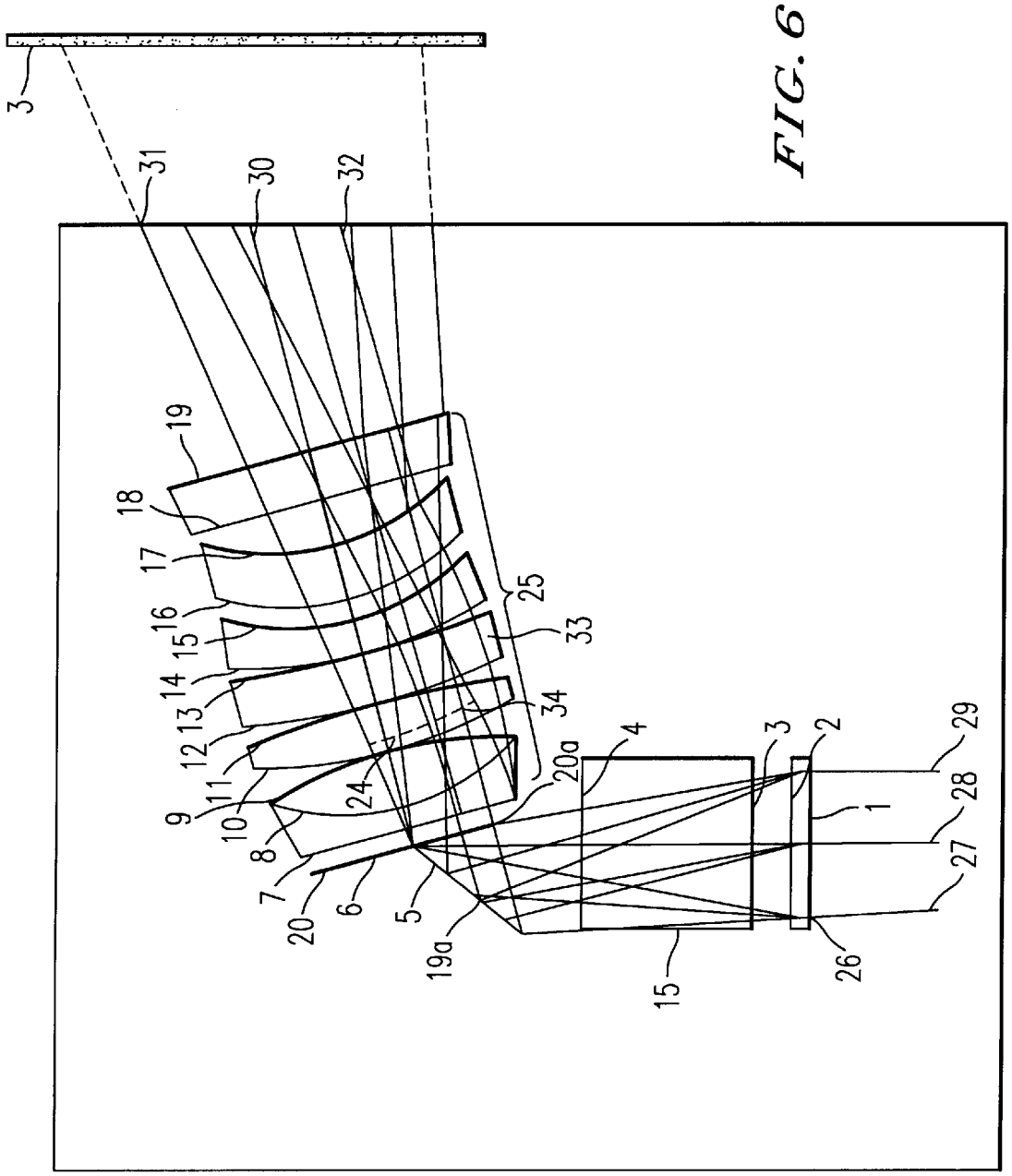
FIG. 6 illustrates rays traced through an image projection component implemented using the component parameters listed in Table 2 according to an embodiment of the present invention.
Figure 7A:
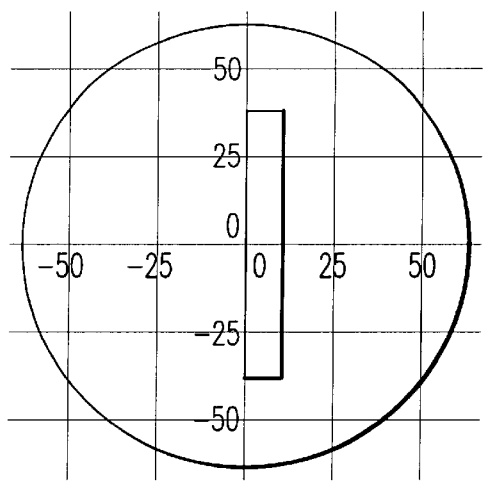
FIG. 7 illustrates images of a strip-like shutter according to an embodiment of the present invention.
Figure 7B:
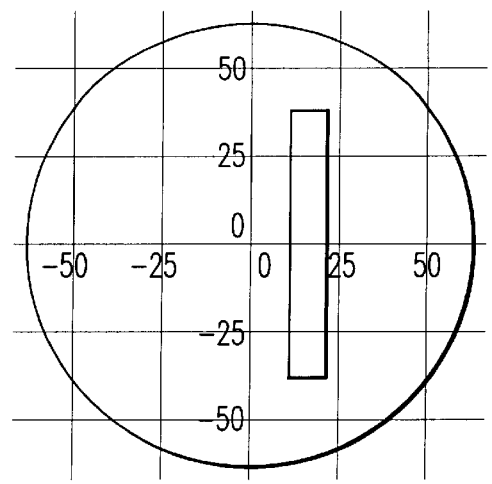
Figure 7C:
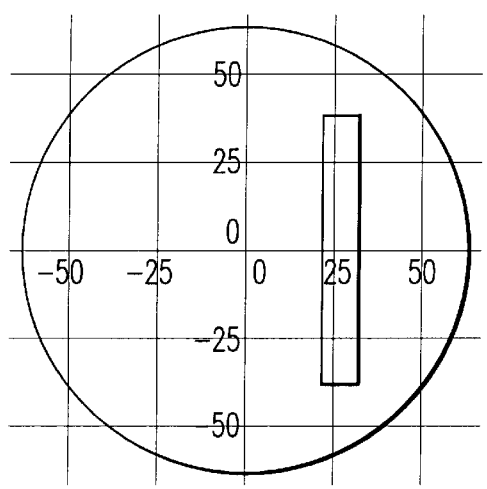
Figure 7D:
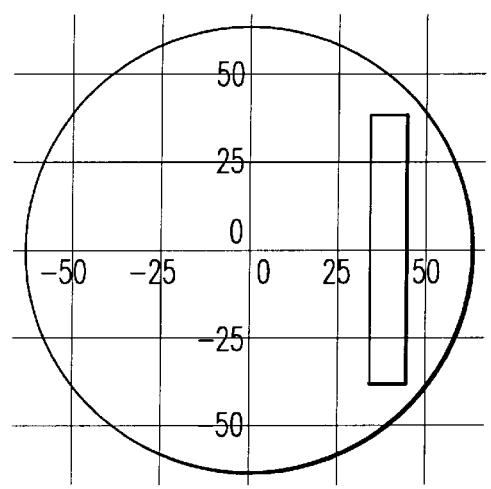
Figure 7E:
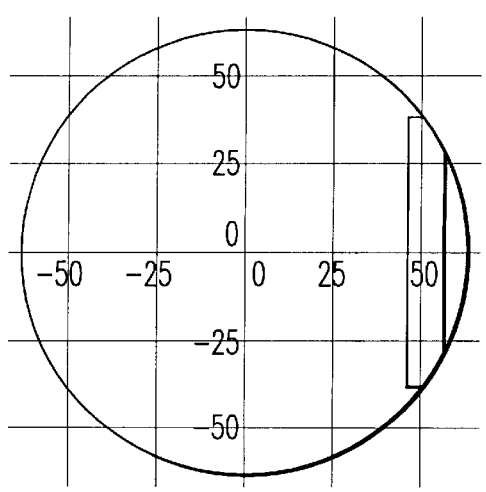
Figure 7F:
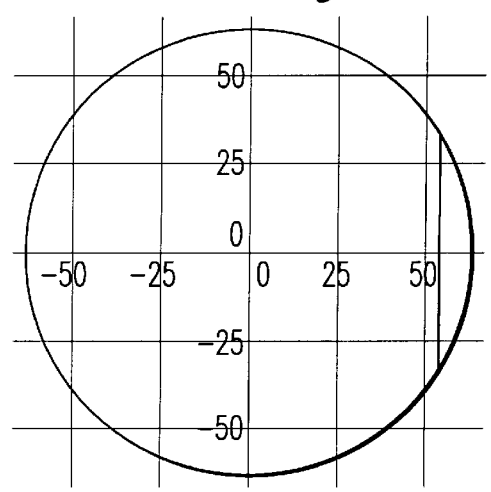

Table 1 provides design specifications for the multiview three-dimensional image display system shown in FIG. 6 when the focal length of the image projection screen is taken to be either 1.4 m or 2.0 m respectively. Table 2 lists design values for the image projection component satisfying the design specifications of Table 1, where the focal length of the image projection screen is taken to be 1.4 m. The values in Table 2 were computed using the optical design program DEMOS. ("DEMOS: State of the Art Application Software for Design, Evaluation and Modeling of Optical Systems" by M. A. Gan, D. D. Zhdanov, V. V. Novoselskiy, S. I. Ustinov, A. O. Fedorov, and I. S. Potyemin, *Optical Engineering*, Vol. 31, No. 4, pp. 696–700, 1992) The design values are optimal values for compensating for chromatic aberration, astigmatism, field of curvature, and distortion of strip-like shutter image formed at the exit pupil.

Were the focal length of the image projection screen changed from 1.4 m to 2.0 m, the distance between the dichroic beam splitter and the bifold mirror would change from 125 mm to 116 mm and the distance between the projection optics surface and the image projection screen would change from 1780 mm to 2622 mm, while all other values given in Table 2 would be unchanged. Optics used to project images from a single image generation component onto a image projection screen would, however, not be suitable for the multiview three-dimensional image system of the present invention. (see, for example, U.S. Pat. No. Re. 35,310 for *Color Corrected Projection Lens*, reissued Aug. 6, 1966 to Moskovich).

TABLE 1

| N | Parameter | Focal length of image display screen F = 1.4 m | Focal length of image display screen F = 2.0 m |
|---|---|---|---|
| 1 | CRT wavelength (nm) | 450, 540, 626 | |
| 2 | Focal length of the projection objective (mm) | | |
| 3 | CRT screen size (mm) | 75 × 100 | 66 × 88 |
| 4 | Image projection screen size (mm) | 605 × 806 | 750 × 1000 |
| 5 | Projection objective power (X) | −7.9 | −11.4 |
| 6 | Exit pupil size of projection objective (mm) | 80 × 132 | |
| 7 | Viewing zone size (mm) | 200 × 330 | |
| 8 | Distortion (%) | 1.5 | |
| 9 | Distance between screen and viewing zone (mm) | 4900 | 7000 |
| 10 | Vignetting (%) | 0 | 0 |
| 12 | Number of view images | 16 | 16 |
| 13 | Image projection screen power | 2.5 | |

TABLE 2

| N | component name | surface number | radius (mm) | distance to front surface | refractive index λ = 540 nm | glass type | effective diameter (mm) |
|---|---|---|---|---|---|---|---|
| 1 | CRT Screen | 1 | plane | 11.5 | 1.54 | BAK2 | 100*75 |
|   |   | 2 | plane | 30 | 1 |   | 100*75 |
| 2 | Dichroic Beam Splitter | 3 | plane | 120.0 | 1.5186 | BK7 | 120 |
|   |   | 4 | plane | 125.0 | 1 |   | 120 |
| 3 | Bifold Mirror | 5 | plane | 0.0 |   |   | 80*98 |
| 4 | Aperture Stop | 6 | plane | 10.0 |   |   | 132*80 |
| 5 | Lens | 7 | 525.5 | 20.0 | 1.6159 | SF2 | 147.6 |
|   |   | 8 | 160.32 | 40.0 | 1.6159 | SK4 | 163.8 |
|   |   | 9 | −359.9 | 1.0 | 1 |   | 167.4 |
| 6 | Lens | 10 | 356.5 | 35.0 | 1.6159 | SK4 | 178.2 |
|   |   | 11 | −2461.0 | 1.0 | 1 |   | 180.2 |
| 7 | Lens | 12 | 667.7 | 35.0 | 1.6159 | SK4 | 181.2 |
|   |   | 13 | 793.5 | 1.0 | 1 |   | 179.8 |
| 8 | Lens | 14 | 295.9 | 25.0 | 1.6159 | SF2 | 180.6 |
|   |   | 15 | 136.32 | 15.0 | 1 |   | 172.4 |
| 9 | Lens | 16 | 154.76 | 40.0 | 1.6159 | SF2 | 196.0 |
|   |   | 17 | 187.36 | 30.0 | 1 |   | 188.6 |
| 10 | Lens | 18 | 2632.0 | 40.0 | 1.6159 | SK4 | 192.0 |
|   |   | 19 | −1879.0 | 1780.0 | 1 |   | 203.0 |
| 11 | Screen | 20 | Plane |   |   |   | 605*806 | wherein BK, BAK, SK, and SF are standard optical glasses listed in the Schott catalogue.

FIG. 6 shows rays traced from the left component 27, center 28, and right component 29 of the image display surface 26 of an image generation component implemented using the component parameters listed in Table 2. Each of these rays transits a dichroic beam splitter 15, is reflected by a reflecting surface 19a of a bifold mirror, transits the right half 20a of a spatial light modulator 20, transits projection optics 25 consisting of seven lenses, and finally converges to a position on the image projection screen. An exit pupil 24 corresponding to the right half 20a of the spatial light modulator 20 exists between point 33, the intersection of the ray 31 and a line extending from the ray 30 passing through the center of the projection optics 25, and point 34, the intersection of a line extending from the ray and a line parallel to the spatial light modulator.

FIG. 7 illustrates images of several strip-like shutters formed by light emanating from image display devices located at three surfaces of the dichroic beam splitter shown in FIGS. 2 and 3. These images are formed at the exit pupil of the projection optics implemented using the component parameters listed in Table 2. The three images formed by light emanating from the three image display devices overlap with little error. The projection optics defined by Table 2 exhibit chromatic aberration of not more than 2.5 mm in meridional and sagittal sections. Such chromatic aberration is smaller than the resolution of human eye seen from the designed view distance (i.e., between 4.9 m and 7 m), so that an image blur due to this chromatic aberration cannot be sensed by human eye.

As described above, the multiview three-dimensional image display system of the present invention has two channels of multiview images, each displayed by means of a conventional image display device, and spatially combines the viewing zones of the two channels into a single continuous viewing zone, so that the combined channels display twice as many multiview images as each channel alone was capable of displaying.

Moreover, the image projection screen may be a holographic screen, so that a plurality of viewing zones can be formed. Although the embodiment shown in FIG. 3 provides full-color images by means of a dichroic beam splitter, full-color images may also be generated by other means.

Various modifications of the invention described above will be apparent to and can be readily made by those skilled in the art without departing from the scope and spirit of this invention. Accordingly, the above description is intended to be exemplary only and is not intended to limit the present invention in any way except as set forth in the following claims.

What is claimed is:

1. An autostereoscopic multiview three-dimensional image display system comprising:
   an image projection screen;
   two image generation components, each component generating successive finite time sequences of time-multiplexed multiview images, whereby two channels of multiview images are formed;
   a bifold mirror having two reflecting surfaces, a folding line, and a folding angle, each surface reflecting a different one of the two channels of the multiview images;
   an spatial light modulator comprising a plurality of strip-like shutters the spatial light modulator having a line of symmetry parallel to the strip-like shutters, each shutter transmitting a different one of each finite time sequence of one of the channels of multiview images; and
   optics for projecting onto the image projection screen the images transmitted by the spatial light modulator,
   wherein the two channels of multiview images generated by the image generation components, reflected by the reflecting surfaces, and transmitted through the spatial light modulator are combined into a single viewing zone without overlapping.

2. The image display system of claim 1, wherein the folding line of the bifold mirror is parallel to the line of symmetry of the spatial light modulator and wherein the folding angle of the bifold mirror is such that each half of the spatial light modulator transmits images reflected by a different one of the reflecting surfaces of the mirror.

3. The image display system of claim 2, wherein the number of the strip-like shutters is twice the larger of the two numbers of images in the finite time sequences of time-multiplexed multiview images generated by the two image generation components.

4. The image display system of claim 2, wherein the number of the strip-like shutters is twice the larger of the two numbers of images in the finite time sequences of time-multiplexed multiview images generated by the two image generation components, wherein openings/closings of each pair of the strip-like shutters symmetrically disposed with respect to the line of symmetry are performed simultaneously and the openings/closings of the strip-like shutters to either side of the line of symmetry are performed in order of the distances of the shutters from the line of symmetry.

5. The image display system of claim 4, wherein each of the two image generation components comprises three image display devices, each device displaying a different one of three primary color images, and a dichroic beam splitter combining the three primary color images into a full-color image.

6. The image display system of claim 4, wherein the image projection screen is a holographic screen capable of forming a plurality of viewing zones.

7. The image display system of claim 2, wherein each of the two image generation components comprises three image display devices, each device displaying a different one of three primary color images, and a dichroic beam splitter combining the three primary color images into a full-color image.

8. The image display system of claim 2, wherein the image projection screen is a holographic screen capable of forming a plurality of viewing zones.

9. The image display system of claim 1, wherein the number of the strip-like shutters is twice the larger of the two numbers of images in the finite time sequences of time-multiplexed multiview images generated by the two image generation components.

10. The image display system of claim 1, wherein each of the two image generation components comprises three image display devices, each device displaying a different one of three primary color images, and a dichroic beam splitter combining the three primary color images into a full-color image.

11. The image display system of claim 1, wherein the image projection screen is a holographic screen capable of forming a plurality of viewing zones.

12. Projection optics having characteristics as set forth below:

| N | component name | surface number | radius (mm) | distance to the front surface | refractive index $\lambda = 540$ nm | glass type | effective diameter (mm) |
|---|---|---|---|---|---|---|---|
| 1 | CRT Screen | 1 | plane | 11.5 | 1.54 | BAK2 | 100*75 |
|   |   | 2 | plane | 30 | 1 |   | 100*75 |
| 2 | Dichroic Beam Splitter | 3 | plane | 120.0 | 1.5186 | BK7 | 120 |
|   |   | 4 | plane | 125.0 | 1 |   | 120 |
| 3 | Bifold Mirror | 5 | plane | 0.0 |   |   | 80*98 |
| 4 | Aperture Stop | 6 | plane | 10.0 |   |   | 132*80 |
| 5 | Lens | 7 | 525.5 | 20.0 | 1.6159 | SF2 | 147.6 |
|   |   | 8 | 160.32 | 40.0 | 1.6159 | SK4 | 163.8 |
|   |   | 9 | −359.9 | 1.0 | 1 |   | 167.4 |
| 6 | Lens | 10 | 356.5 | 35.0 | 1.6159 | SK4 | 178.2 |
|   |   | 11 | −2461.0 | 1.0 | 1 |   | 180.2 |
| 7 |   | 13 | 793.5 | 1.0 | 1 |   | 179.8 |
| 8 | Lens | 14 | 295.9 | 25.0 | 1.6159 | SF2 | 180.6 |
|   |   | 15 | 136.32 | 15.0 | 1 |   | 172.4 |
| 9 | Lens | 16 | 154.76 | 40.0 | 1.6159 | SF2 | 196.0 |
|   |   | 17 | 187.36 | 30.0 | 1 |   | 188.6 |
| 10 | Lens | 18 | 2632.0 | 40.0 | 1.6159 | SK4 | 192.0 |
|   |   | 19 | −1879.0 | 1780.0 | 1 |   | 203.0 |
| 11 | Screen | 20 | Plane |   |   |   | 605*806 | wherein BK, BAK, SK, and SF are standard optical glasses listed in the Schott catalog.

* * * * *